United States Patent
Wang et al.

(10) Patent No.: US 11,159,538 B2
(45) Date of Patent: Oct. 26, 2021

(54) CONTEXT FOR MALWARE FORENSICS AND DETECTION

(71) Applicant: Palo Alto Networks, Inc., Santa Clara, CA (US)

(72) Inventors: Jun Wang, Fremont, CA (US); Wei Xu, Santa Clara, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 192 days.

(21) Appl. No.: 15/885,388

(22) Filed: Jan. 31, 2018

(65) Prior Publication Data
US 2019/0238565 A1     Aug. 1, 2019

(51) Int. Cl.
*H04L 29/06*     (2006.01)
*G06F 21/56*     (2013.01)

(52) U.S. Cl.
CPC ........ *H04L 63/1416* (2013.01); *G06F 21/564* (2013.01); *G06F 21/566* (2013.01); *H04L 63/145* (2013.01); *H04L 63/1425* (2013.01)

(58) Field of Classification Search
CPC ............... H04L 63/1416; H04L 63/145; H04L 63/1425; H04L 29/06; G06F 21/566; G06F 21/564
USPC ........................................................ 726/23
See application file for complete search history.

(56) References Cited

U.S. PATENT DOCUMENTS

| | | | |
|---|---|---|---|
| 5,826,013 A | 10/1998 | Nachenberg | |
| 5,987,610 A | 11/1999 | Franczek | |
| 6,269,447 B1 | 7/2001 | Maloney | |
| 6,775,780 B1 | 8/2004 | Muttik | |
| 6,981,279 B1 | 12/2005 | Arnold | |
| 8,156,541 B1 | 4/2012 | Thomas | |
| 8,424,091 B1 | 4/2013 | Su | |
| 8,578,497 B2 | 11/2013 | Antonakakis | |
| 8,695,095 B2 * | 4/2014 | Baliga | H04W 12/12 726/24 |
| 8,763,127 B2 | 6/2014 | Yao | |
| 8,793,787 B2 | 7/2014 | Ismael | |
| 8,806,639 B2 | 8/2014 | Mohler | |
| 9,071,638 B1 | 6/2015 | Aziz | |
| 9,088,606 B2 | 7/2015 | Ranum | |
| 9,165,142 B1 * | 10/2015 | Sanders | H04L 63/1441 |
| 9,565,202 B1 | 2/2017 | Kindlund | |
| 2003/0135791 A1 | 7/2003 | Natvig | |
| 2003/0200464 A1 | 10/2003 | Kidron | |

(Continued)

OTHER PUBLICATIONS

Andriatsimandefitra et al., "Detection and Identification of Android Malware Based on Information Flow Monitoring," 2015 IEEE 2nd International Conference on Cyber Security and Cloud Computing, New York, NY, pp. 200-203, 2015.

(Continued)

*Primary Examiner* — Quazi Farooqui
(74) *Attorney, Agent, or Firm* — Van Pelt, Yi & James LLP (57) ABSTRACT

A malware profile is received. The malware profile comprises a set of one or more activities associated with executing a copy of a known malicious application that is associated with the malware profile. A set of one or more log entries is analyzed for a set of entries that matches the malware profile. Based at least in part on identifying the set of entries matching the malware profile, a determination is made that a host was compromised.

27 Claims, 8 Drawing Sheets

(56) References Cited

U.S. PATENT DOCUMENTS

| | | | |
|---|---|---|---|
| 2004/0064731 A1* | 4/2004 | Nguyen | H04L 41/147 726/22 |
| 2005/0044422 A1 | 2/2005 | Cantrell | |
| 2005/0182950 A1 | 8/2005 | Son | |
| 2005/0216770 A1 | 9/2005 | Rowett | |
| 2006/0227758 A1 | 10/2006 | Rana | |
| 2007/0016953 A1 | 1/2007 | Morris | |
| 2007/0056038 A1 | 3/2007 | Lok | |
| 2007/0118350 A1 | 5/2007 | Van Der Made | |
| 2007/0121615 A1 | 5/2007 | Weill | |
| 2007/0192866 A1 | 8/2007 | Sagoo | |
| 2007/0289010 A1 | 12/2007 | Thomas | |
| 2008/0005782 A1 | 1/2008 | Aziz | |
| 2008/0016570 A1 | 1/2008 | Capalik | |
| 2008/0196104 A1 | 8/2008 | Tuvell | |
| 2008/0209557 A1 | 8/2008 | Herley | |
| 2008/0250128 A1 | 10/2008 | Sargent | |
| 2008/0307493 A1 | 12/2008 | Moghe | |
| 2009/0013405 A1 | 1/2009 | Schipka | |
| 2009/0064337 A1 | 3/2009 | Chien | |
| 2009/0094697 A1 | 4/2009 | Provos | |
| 2009/0126016 A1 | 5/2009 | Sobko | |
| 2009/0144827 A1 | 6/2009 | Peinado | |
| 2009/0238071 A1 | 9/2009 | Ray | |
| 2009/0282483 A1 | 11/2009 | Bennett | |
| 2010/0077476 A1 | 3/2010 | Adams | |
| 2010/0077481 A1 | 3/2010 | Polyakov | |
| 2010/0115620 A1 | 5/2010 | Alme | |
| 2010/0115621 A1 | 5/2010 | Staniford | |
| 2010/0146615 A1 | 6/2010 | Locasto | |
| 2010/0212010 A1 | 8/2010 | Stringer | |
| 2010/0217801 A1 | 8/2010 | Leighton | |
| 2011/0041179 A1 | 2/2011 | Staahlberg | |
| 2011/0071179 A1 | 3/2011 | Jahangir | |
| 2011/0078794 A1 | 3/2011 | Manni | |
| 2011/0099633 A1 | 4/2011 | Aziz | |
| 2011/0173698 A1 | 7/2011 | Polyakov | |
| 2011/0219448 A1 | 9/2011 | Sreedharan | |
| 2011/0252474 A1 | 10/2011 | Ward | |
| 2011/0276699 A1 | 11/2011 | Pedersen | |
| 2011/0321160 A1 | 12/2011 | Mohandas | |
| 2012/0054866 A1 | 3/2012 | Evans | |
| 2012/0222121 A1 | 8/2012 | Staniford | |
| 2012/0233691 A1 | 9/2012 | Jiang | |
| 2012/0255021 A1 | 10/2012 | Sallam | |
| 2012/0272316 A1* | 10/2012 | Clevy | G06F 21/55 726/22 |
| 2012/0304244 A1 | 11/2012 | Xie | |
| 2013/0086684 A1 | 4/2013 | Mohler | |
| 2013/0091570 A1 | 4/2013 | McCorkendale | |
| 2013/0104230 A1 | 4/2013 | Tang | |
| 2013/0152200 A1 | 6/2013 | Alme | |
| 2013/0239214 A1 | 9/2013 | Klein | |
| 2013/0298244 A1 | 11/2013 | Kumar | |
| 2013/0326625 A1 | 12/2013 | Anderson | |
| 2015/0381637 A1 | 12/2015 | Raff | |
| 2016/0048683 A1 | 2/2016 | Sanders | |
| 2016/0088000 A1* | 3/2016 | Siva Kumar | H04L 63/10 726/23 |
| 2016/0147995 A1 | 5/2016 | Sallam | |
| 2017/0359306 A1* | 12/2017 | Thomas | H04L 63/145 |
| 2018/0091528 A1* | 3/2018 | Shahbaz | H04L 63/1458 |

OTHER PUBLICATIONS

Author Unknown, "IOC Finder", Mandiant—Detect. Respond. Contain., Oct. 31, 2011.

Cesare et al., "Malwise—An Effective and Efficient Classification System for Packed and Polymorphic Malware", IEEE Transactions on Computers, 2012.

Hosmer et al., "Polymorphic and Metamorphic Malware", Black Hat Briefings and Training, 2008, WetStone Technologies.

Jang et al., "Andro-profiler: anti-malware system based on behavior profiling of mobile malware", In Proceedings of the 23rd International Conference on World Wide Web (WWW '14 Companion). ACM, New York, NY, USA, 737-738. 2014.

Jang et al., "Detecting and classifying method based on similarity matching of Android malware behavior with profile", SpringerPlus, 2016.

* cited by examiner

```
        name: Sarodip
404⌐    ┌events:[              ┌406           ┌408                            ┌410
414⌐ ╱ ╷  {proto: http, dst_port: 80, http_host: 'twitter.com', http_uri:'/
     ╲ │  pidoras6'},⌐412
    402┤  {proto: http, dst_port: 80, http_host: 'www.virustotal.com',
     ╱ │  http_uri:'/vtapi/v2/file/scan'},
416⌐ ╲ └  {proto: tcp, dst_port: 443}
        ]
        event_order: true⌐418
        time_window: 5 minutes⌐420
```

FIG. 4A

```
        name: Allaple
426⌐    ┌events:[
     ╱  │  {proto: icmp},                  ┌428
    424┤   {proto: tcp, dst_port: 138},⌐430
     ╲  │  {proto: tcp, dst_port: 445},⌐432
        └  {proto: tcp, dst_port: 9988}
        ]
        event_order: true
        time_window: 5 minutes
```

FIG. 4B

```
        name: VTBoss
436⌐    ┌events:[
     ╱  │  {proto: http, dst_port: 80, http_host: 'vtboss.yolox.net',
    434┤  http_uri: '/md5.php'},
     ╲  │  {proto: http, dst_port: 80, http_host: 'www.virustotal.com',
438⌐    └  http_uri: '/vtapi/v2/file/scan'}
        ]
        event_order: true⌐440
        time_window: 60 seconds⌐442
```

CONTEXT FOR MALWARE FORENSICS AND DETECTION

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS)

request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Figure 1:
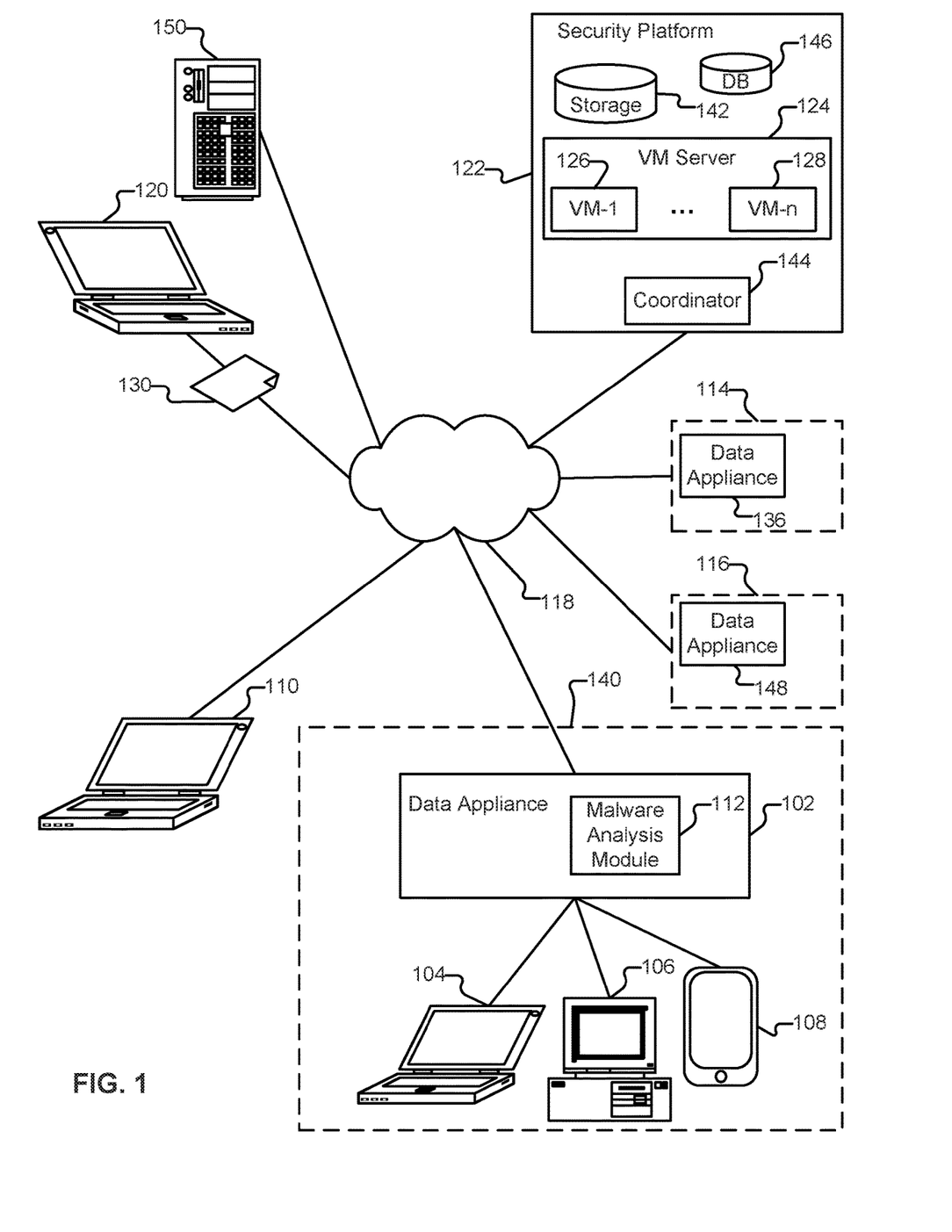
FIG. 1 illustrates an example of an environment in which malicious applications ("malware") are detected and prevented from causing harm.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while "malware profiles" are described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2:
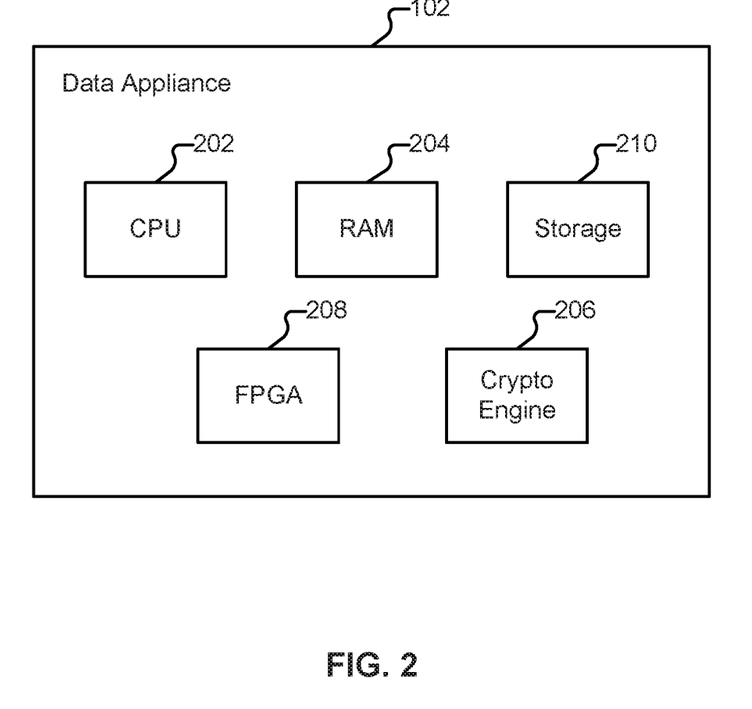
FIG. 2 illustrates an embodiment of a data appliance.

An embodiment of a data appliance is shown in FIG. 2. The example shown is a representation of physical components that are included in data appliance 102, in various embodiments. Specifically, data appliance 102 includes a high performance multi-core CPU 202 and RAM 204. Data appliance 102 also includes a storage 210 (such as one or more hard disks), which is used to store policy and other configuration information, as well as other information such as URL categorization information and malware profiles. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Data appliance 102 can take a variety of forms. For example, data appliance 102 can comprise a dedicated device or set of devices. The functionality provided by data appliance 102 can also be integrated into or executed as software on a general purpose computer, a computer server, a gateway, and/or a network/routing device. In some embodiments, services provided by data appliance 102 are instead (or in addition) provided to a client device (e.g., client device 104) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable.

In the example shown in FIG. 1, a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to client device 104 to which a copy of malware 130 has been attached. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140).

If no signature for an attachment is found, in various embodiments, data appliance 102 is configured to provide the file for static/dynamic analysis, to determine whether it is malicious and/or to otherwise classify it. As one example, data appliance 102 can send a copy of malware 130 to security platform 122 for analysis. Security platform 122 can also (or instead) obtain copies of applications for evaluation from sources other than data appliance 102 (e.g., data appliances 136 and/or 148). In various embodiments, analysis of malware 130 is performed at least partially on premise (e.g., within enterprise network 140). For example, analysis described herein as being performed by security platform 122 can also be performed by a malware analysis module 112 included in data appliance 102.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliance 102 can be configured to automatically block the file download based on the analysis result. Further, a signature can be generated for the malware and distributed (e.g., to other data appliances such as data appliances 136 and 148) to automatically block future file transfer requests to download the file determined to be malicious.

In various embodiments, security platform 122 comprises one or more dedicated commercially available hardware servers (e.g., having multi-core processor(s), 8G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122 and transmit applications to security platform 122 for analysis).

Analyzing Samples Using Static/Dynamic Analysis

Figure 3:
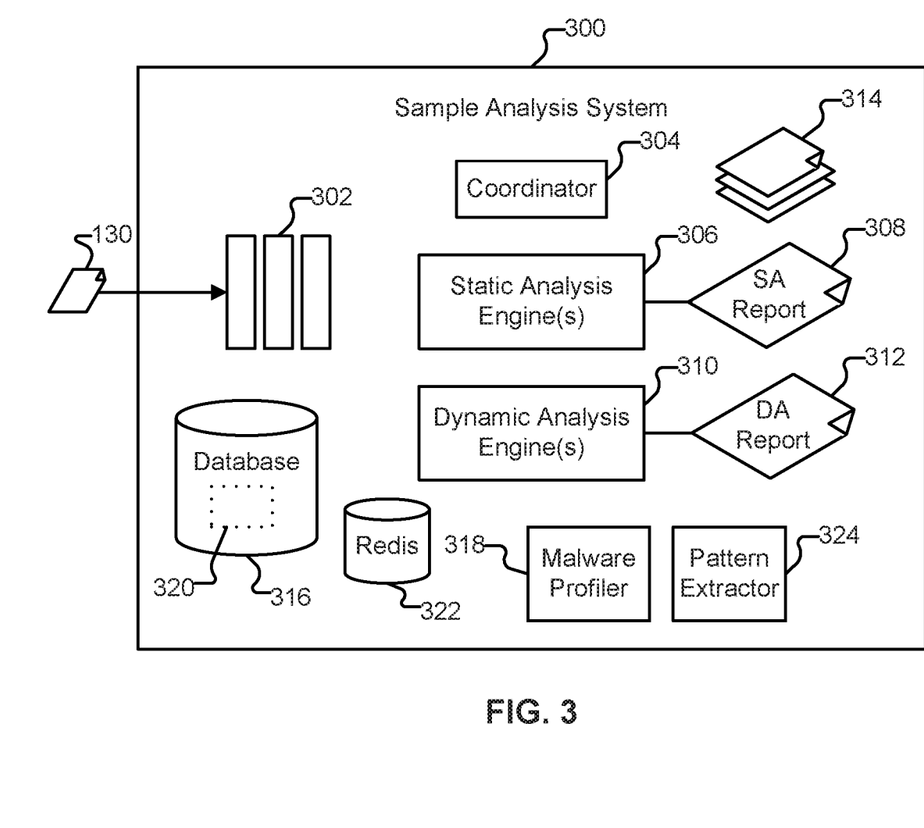
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft XP SP 3 vs. Windows 7 SP 2, or iOS 9.0 vs. iOS 10.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc., (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

False Negatives and False Positives

Some types of malware make use of malicious resources in furtherance of their malicious activities. Examples of such malicious resources include command and control (C&C) servers (e.g., server 150), servers that facilitate data exfiltration, phishing sites, and sites hosting malicious executables (e.g., ransomware or spyware). As mentioned above, both static and dynamic analysis engines can use information about known malicious resources in performing their respective analysis, and/or arriving at maliciousness verdicts. Such information (e.g., known malicious domains, known malicious IP addresses, known malicious URLs, and/or user agent strings associated with malware) is also referred to herein as a network "indicator of compromise" (IOC).

Unfortunately, the absence (or presence) of network IOCs (e.g., while determining a verdict based on static/dynamic analysis) is not always dispositive of the maliciousness of an application. As one example, some malware makes malicious use of otherwise popular and benign domains (e.g., pastebin.com). The malware's contacts with such domains (which may appear on a whitelist in collection 314), and absence of contacts with other (known malicious) domains, could result in sample analysis system 300 erroneously returning a verdict of "not malicious" (i.e., a false negative result). As a second example, a benign application can erroneously be classified as malicious (i.e., a false positive result) where the benign application makes use of a shared (or recycled) domain, IP address, or other resource that (coincidentally) is also used for malicious purposes. Further, there are some situations (e.g., service probing activities and/or denial of service attack activities) that traditional IOCs do not cover.

Using techniques described herein, actions taken by known malicious applications (e.g., network activity or other activities) are profiled, and used to generate corresponding malware profiles. Malware profiles can be used in a variety of beneficial ways. As a first example, malware profiles can be used to complement the analysis (e.g., as described above) performed by static analysis engine 306 and dynamic analysis engine 310, helping to minimize false negatives and false positives in verdicts. As a second example, malware profiles can be provided to firewalls, intrusion detection systems, intrusion prevention systems, or other appropriate appliances. In the event a client device protected by such an appliance performs actions that match a malware profile (e.g., within a threshold amount), such behavior can be treated as suspicious/malicious by the appliance, and remedial actions can be taken. As a third example, malware profiles can be provided to endpoint protection applications (e.g., installed on client device 110), which can monitor client activities for matches against such profiles.

Malware Profiles

Figure 4A:
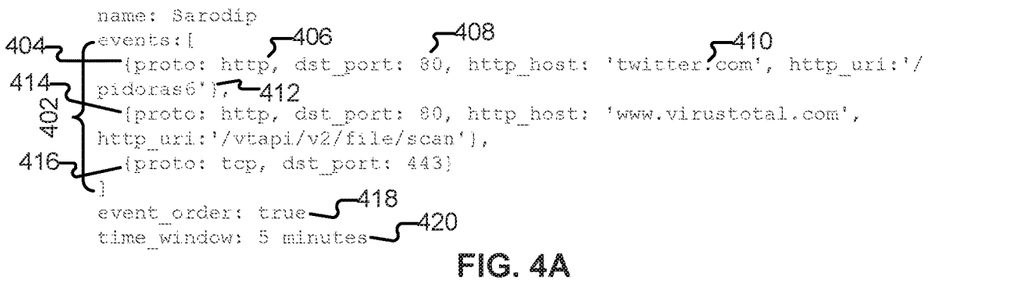
FIGS. 4A-4C illustrate examples of malware profiles.
Figure 4B:
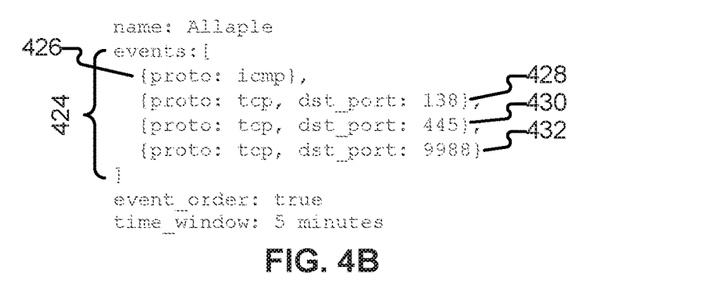
Figure 4C:
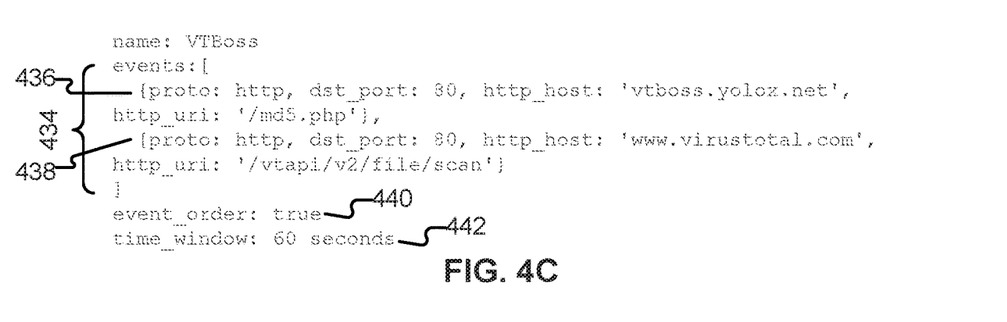

FIGS. 4A-4C depict, respectively, malware profiles that correspond to Sarodip, Allaple, and VTBoss. The profiles describe (in an appropriate format, such as JSON) a sequence of events, and corresponding attributes (e.g., protocol, destination port, host, and/or URL). Each individual event included in a given profile may appear benign (e.g., contacting twitter.com). Taken as a whole, however, the combined set of events can be used to help better identify whether a sample is malicious or not, including by uniquely and exclusively identifying a sample as belonging to a family of malware.

Malware in the Sarodip family (also known by the name "Pidoras") is responsible for performing a distributed denial of service (DDoS) attack against both the VirusTotal web service, as well as a URL of the attacker's choosing (using a twitter account for command and control). When executed, Sarodip malware makes a request to twitter.com (over port 80) for the user, "pidoras6." The latest tweet from the user (e.g., ")))))
aHR0cHM6Ly93MHJtLm1uL2pvaW4vam9pbi5waA=")
is parsed, removing the leading ")))))" characters, and base 64 decoding the remaining characters. The resulting URL (e.g., w0rm.in/join/join.php) is used to make subsequent HTTP requests, which repeat indefinitely. Sarodip malware also spawns a thread that is responsible for reading itself and modifying the PE header at offset 68. This provides a unique sample for each subsequent submission to VirusTotal. It proceeds to submit this file to the VirusTotal web service via an HTTP POST request to www.virustotal.com/vtapi/v2/file/scan, a process that also repeats indefinitely. Sarodip also performs encrypted (HTTPS) communications via TCP.

A malware profile corresponding to Sarodip network traffic is shown in FIG. 4A. In particular, the sequence of network events that make up a Sarodip attack are shown in region 402. First (404), an HTTP (406) connection is made via destination port 80 (408) to twitter.com (410), and the user pidoras6's feed is requested (412). Next (414), an HTTP connection is made via destination port 80 to www-.virustotal.com and /vtapi/v2/file/scan is accessed. Sarodip then commences TCP traffic using destination port 443 (416). As indicated in region 418, events are required to occur in the sequence shown in the profile (404, 414, 416) in order for the profile to be matched. Further, the events must all be observed within a five minute time period (420). In other profiles, the ordering of events may not be strictly required, and a value of "false" can be used in a corresponding region 418. And, in other profiles, other time periods can be specified in corresponding regions 420.

Allaple is a network worm that tries to spread to Windows file shares using a list of pre-defined logins and passwords, and then launches targeted DDoS attacks. A malware profile corresponding to Allaple network traffic is shown in FIG. 4B. In particular, the sequence of network events that make up an Allaple attack are shown in region 424. First (426), ICMP is used to ping potential victims. Then (428), a data stream is sent to a remote address via port 138. During an Allaple attack, data streams are also sent to remote addresses via port 445 (430), and to remote addresses via port 9988 (432). As with Sarodip, events must occur in the order shown in the Allaple profile, and the specified set of events must be observed within a five minute window, in order for network activity to be considered a match with the profile shown in FIG. 4B. In various embodiments, additional types of events are included in a malware profile. Using the Allaple profile as an example, one additional action taken by Allaple malware is to attempt to write WINDOWS\system32\urdvxc.exe. Such an action (also referred to herein as a local action) can also be included in the Allaple profile accordingly (e.g., as an event occurring prior to event 426). Other examples of local actions (which can be included in a malware profile) include performing code injection, modifying a registry, attempts at self-deletion, and attempts to perform encryption operations on files.

Malware in the VTBoss family was designed to perform a DDoS attack against the VirusTotal web service. The malware begins by taking an MD5 hash of itself and sending the information to http://vtboss.yolox.net/md5.php via an HTTP POST request. It subsequently enters an infinite loop where it (as with Sarodip) reads itself and modifies the PE header at offset 68, then sends the resulting file to the VirusTotal web service via an HTTP POST request to www.virustotal.com/vtapi/v2/file/scan.

A malware profile corresponding to the VTBoss family of malware is shown in FIG. 4C. In particular, the sequence of network events that make up a VTBoss attack are shown in region 434. First (436), an HTTP connection is made via destination port 80 to vtboss.yolox.net and /md5.php is accessed. Then (438), an HTTP connection is made via destination port 80 to www.virustotal.com and /vtapi/v2/file/scan is accessed. As indicated in region 440, events are required to occur in the sequence shown in the profile in order for the profile to be matched. Further, the events must both be observed within a one minute time period (442).

Figure 5:
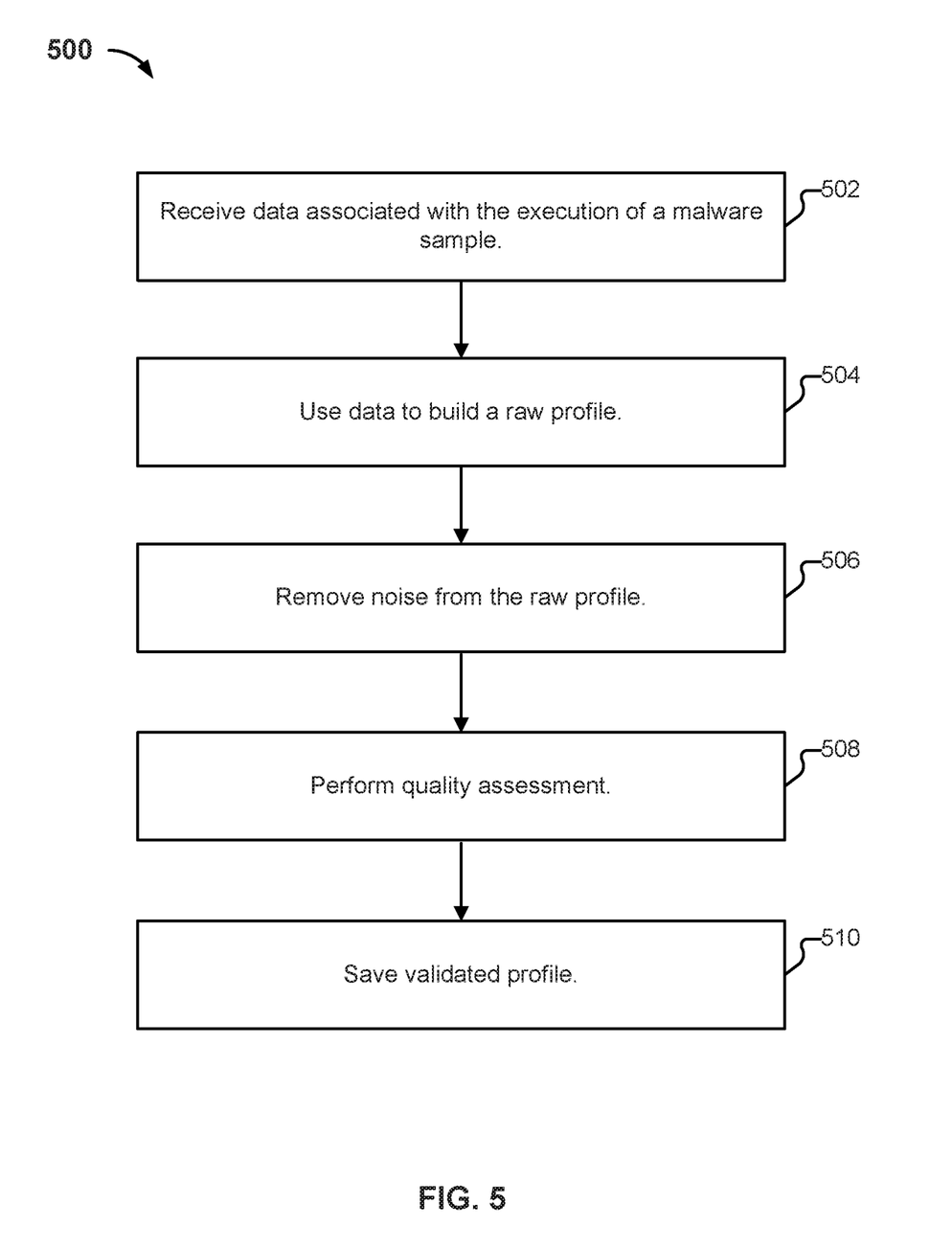
FIG. 5 illustrates an example of a process for building a malware profile.

FIG. 5 illustrates an example of a process for building a malware profile. In various embodiments, process 500 is performed by malware profiler 318, for a piece of known malware 320. One example way to implement malware profiler 318 is using a script (or set of scripts) authored in an appropriate scripting language (e.g., Python). Process 500 begins at 502 when data associated with the execution of a malware sample is received. As previously explained, database 316 (e.g., a MongoDB database) includes a variety of information about malware such as malware 320, including information obtained during dynamic analysis. Database 316 also includes similar information about benign samples.

As one example of processing that can be performed at 502, malware profiler 318 accesses database 316 and obtains a raw network trace for malware 320 (e.g., recorded during dynamic analysis). The raw network packets are parsed (e.g., using the dpkt Python module) and aggregated by malware profiler 318 into request-response pairs (roundtrip). The pairs are then merged into a series of network activities by correlating the pairs' source IP/port and destination IP/port. One example of a network activity (NA) is using the HTTP protocol to access twitter.com/pidoras6 on the destination port 80. A formal way to define a particular NA is using a four-tuple of attributes: NA=<protocol, destination port, HTTP host, HTTP URI>. Other types of information can also be included in the definition of an NA in addition to/instead of the four attributes listed above. As one example, a profile could further include user agent (e.g., in the case of HTTP traffic), number of packets sent/received, size of each packet sent/received, and/or traffic direction. Generally, the more attributes that are included in the malware profile, the more accurate the profile will be at uniquely describing a piece of malware (helping avoid false positive matches against benign application behaviors). However, a strict profile (e.g., comprising more attributes than the four-tuple described above) may be less likely to match new variants of a piece of malware. A raw profile (P) can be constructed (504) using a sequence of network activities: P=NA1, NA2, NA3, etc.

In some cases, the raw profile will include network activity that occurs coincident to the execution of malware 320. For example, system level activities (such as Windows synchronizing a clock) may also result in network activities included in the raw profile. At 506, the raw profile is filtered to help ensure that a malware profile uniquely represents the characteristics of a given piece of malware. In various embodiments, such filtering includes removing network activities associated with NTP, NETBIOS, and IGMP.

At 508, one or more assessments of the filtered profile are performed to determine whether the profile sufficiently uniquely describes the malware sample's activities. One example of such an assessment that can be performed at 508 is to determine whether the filtered profile matches any existing malware profiles (e.g., already present in database 316). If so, this can indicate that the malware (e.g., malware 320) belongs to a family of samples, which exhibit identical (or similar) behaviors during execution. If the filtered profile matches a profile associated with a malware family, the malware can be associated (e.g., in database 316) with other samples belonging to the family. For efficiency, during enforcement, a single profile (or reduced set of profiles) for the family can be used to help detect whether a sample is malicious (i.e., is a member of the family).

A family match can be strict (i.e., the filtered profile must exactly match the profile for a family in order to be considered a match). A family match can also be fuzzy, subject to a tolerance. As one example, some variants in the Allaple family of malware may perform each of actions 428, 430, and 432. Other variants in the Allaple family may perform actions 428 and 430 without performing action 432. In some embodiments, a single malware profile for the Allaple family is stored in database 316, which indicates that action 432 is optional. In other embodiments, database 316 can include two profiles for the Allaple family—one which includes action 432 and one which does not.

Another example of an assessment that can be performed at 508 is to perform a regression test using the filtered profile and historical pcaps for the samples stored in database 316. As previously mentioned, database 316 includes static/dynamic analysis reports on both benign samples and malicious samples. If applying the filtered profile to the historical pcaps results in more than a threshold number of false positives (e.g., 3% or more of the matches made by the profile are pcaps of benign samples), the filtered profile is likely not suitable for use, and process 500 terminates early, as applicable (without storing the filtered profile as a malware profile).

At 510, the filtered, validated malware profile for malware 320 is stored. In some embodiments, the profile is stored in database 316. In addition (or, in various embodiments, instead), the malware profile can also be inserted into another storage. As one example, each network activity can be broken into a key-value pair, and stored in a pluggable backend key-value pair store (e.g., Redis store 322), for faster lookups during real-time analysis of samples.

Using Malware Profiles

As mentioned above, malware profiles can be used in a variety of beneficial ways. As a first example, malware profiles can be used to complement the static/dynamic analysis performed by sample analysis system 300. As a second example, malware profiles can be used by appliances/endpoints (e.g., for forensic analysis and/or endpoint protection).

EXAMPLE

Identifying Malicious Applications

Figure 6:
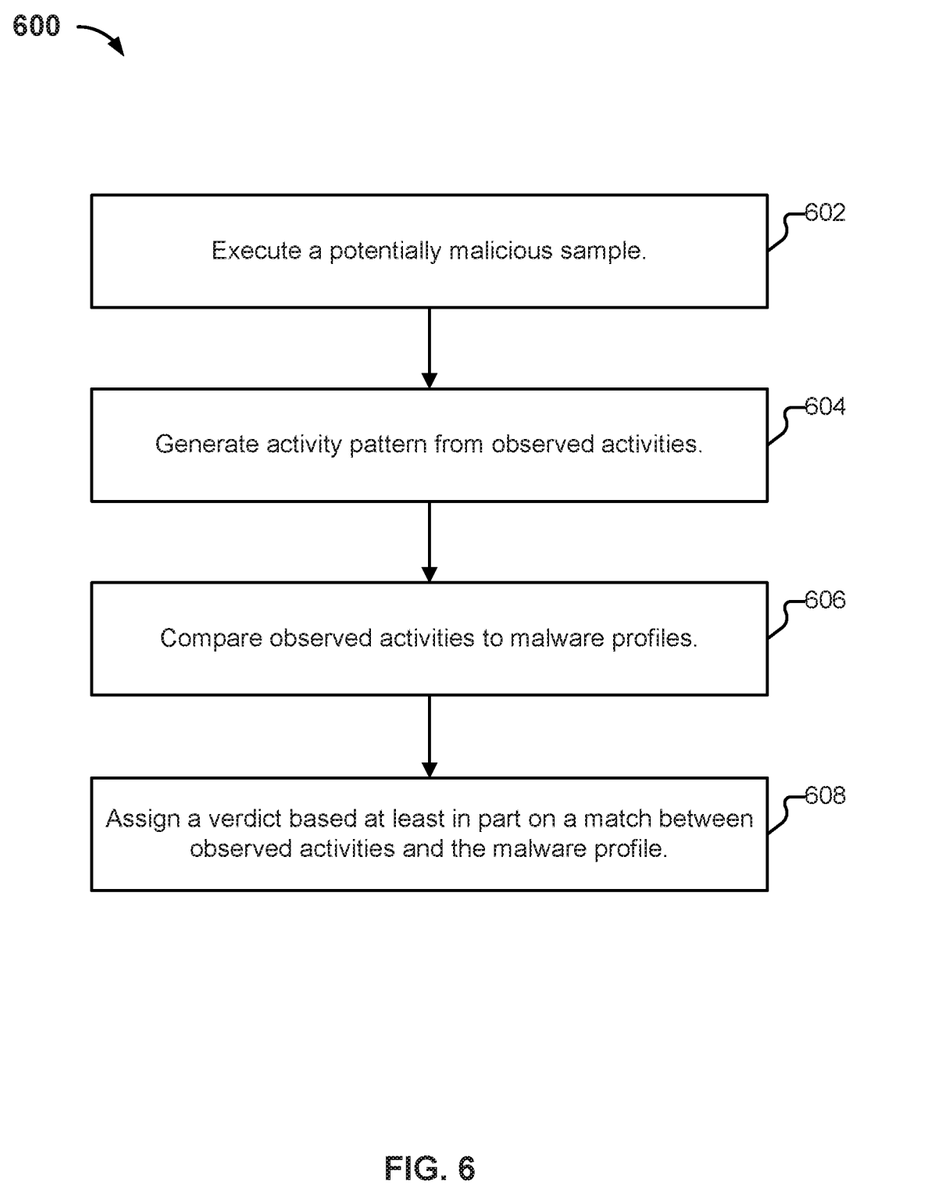
FIG. 6 illustrates an example of a process for determining whether a sample is malicious.

FIG. 6 illustrates an embodiment of a process for determining whether a sample is malicious. In various embodiments, process 600 is performed by sample analysis system 300. The process begins at 602 when a potentially malicious sample is executed. As one example of the processing performed at 602, dynamic analysis engine 310 executes a sample (such as sample 130). Activities that occur during execution of the sample are recorded. As mentioned above, network traffic (e.g., as pcap data) is an example of data that is recorded at 602.

At 604, pattern extractor 324 extracts activities from the information recorded at 602 and generates an activity pattern. One way to implement pattern extractor 324 is using a script (or set of scripts) authored in an appropriate scripting language (e.g., Python). In various embodiments, pattern extractor 324 generates the activity pattern by performing portions of process 502-506 of process 500 (e.g., using the pcap data obtained at 602 and other information as applicable, such as file writes and reads).

At 606, pattern extractor 324 compares the extracted pattern (for the sample) against malware profiles (e.g., previously stored in database 316 and/or store 322 in accordance with process 500). In particular, pattern extractor 324 searches store 322 for the pattern extracted at 604. The comparison performed at 606 can be strict, requiring an exact match between the sample's pattern and a malware profile in store 322. The comparison performed at 606 can also be fuzzy. As one example, a fuzzy match could require that at least 85% of the activities be matched between the sample's pattern and a malware profile in order for a match to be found. As another example, a fuzzy match could require that the same activities occur in both the sample's pattern and a malware profile, but may occur in a different order. As yet another example, a fuzzy match could allow for a less than exact match of one or more attributes, such as a single port number in a single activity being different between the two (but otherwise requiring an exact match).

At 608, a verdict is assigned to the sample. As previously explained, in various embodiments, static analysis engine 306 and dynamic analysis engine 310 (and/or coordinator 304) form one or more verdicts with respect to the maliciousness of a given sample. Pattern extractor 324 can similarly determine a verdict for the sample (which can be used as a factor in determining a final verdict, or, as applicable, can control the final verdict). Pattern extractor 324 can also provide its verdict to dynamic analysis engine 310, which can use pattern extractor 324's verdict as one of its own factors in determining a verdict for the sample. If a match was found at 606 (between the sample's pattern and a malware profile stored in store 322), pattern extractor 324 can assign a verdict of "malicious" for the sample. Additional information can also be returned with a malicious verdict, such as an MD5 or other identifier of the malware whose profile was matched by the sample's pattern, any malware family information associated with the matched malware, etc. If no such match is found, pattern extractor 324 can assign a verdict of "unknown" (or another appropriate verdict, as applicable).

EXAMPLE

Forensic/Inline Analysis

Returning to the environment of FIG. 1, sometimes malware, such as malware 130, will successfully penetrate network 140. One reason for this is where data appliance 102 operates on a "first-time allow" principle. Suppose that when an appliance, such as data appliance 102, submits a sample to security platform 122, it takes security platform 122 approximately fifteen minutes to return a verdict to data appliance 102 (whether "benign," "malicious," "unknown," etc.). Instead of blocking communications between system 120 and client device 104 during that fifteen minute time period, under a first-time allow principle, the communication is allowed. When a verdict is returned (e.g., fifteen minutes later), data appliance 102 can use the verdict (e.g., "malicious") to block subsequent transmissions of malware 130 to network 140, can block communications between system 120 and network 140, etc. Unfortunately, during the fifteen minutes data appliance 102 awaits a verdict from security platform 122, a user of client device 104 could have executed malware 130, potentially causing the propagation of malware 130 to other nodes in network 140 (e.g., to client device 106). Another example way that malware such as malware 130 could penetrate network 140 is due to lateral movement (e.g., where the malware was installed on a node via an infected USB drive, where the malware does not propagate through the firewall, etc.).

Data appliance 102 maintains a set of logs (e.g., a traffic log that logs connection information for network 140, and a URL log that logs URLs requested by clients such as clients 104-110). Using techniques described herein, malware profiles can be used to assist in analysis of such logs, and can help identify and mitigate damage caused by allowing malware (e.g., malware 130) into network 140.

Figure 7A:
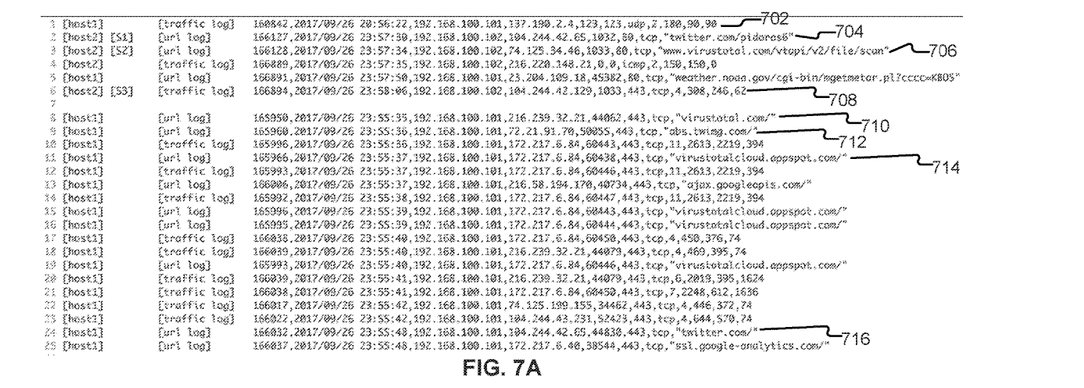
FIG. 7A illustrates an event sequence of data logged by a data appliance.

FIG. 7A illustrates an event sequence of data logged by a data appliance (e.g., data appliance 102). In particular, FIG. 7A illustrates log lines from a traffic log (e.g., lines 1, 4, and 6), and log lines from a URL log (e.g., lines 2, 3, and 5). The log data pertains to two different nodes within a network, hereinafter referred to as "host1" and "host2." In the example shown in FIG. 7A, suppose that host1 is an uncompromised client device, being used (by a user hereinafter referred to as "Alice") to browse various websites. Further suppose that host2 has been compromised by a variant of Sarodip. Lines 2, 3, and 6 of FIG. 7A provide evidence that host2 has been compromised. In particular, host2 accessed www.twitter.com/pidoras6 using HTTP port 80 (704), then accessed www.virustotal.com/vtapi/v2/file/scan also using HTTP port 80 (706), and then made an encrypted (HTTPS) communication via TCP (708).

As shown in FIG. 7A, Alice happens to be browsing the VirusTotal website, and the Twitter website, along with other sites. However, as also shown in FIG. 7A, her benign browsing activities on host1 produce log lines that are significantly different from the log lines produced by compromised host2. In particular, when Alice accesses VirusTotal, her connection makes use of HTTPS (710), and many different resources (e.g., related to the display of advertisements) are requested by her browser in conjunction with her browsing (e.g., 714). Similarly, when Alice accesses Twitter, her connection makes use of HTTPS (716), and many different resources (e.g., related to the display of images) are requested by her browser in conjunction with her browsing (e.g., 712).

Figure 7B:
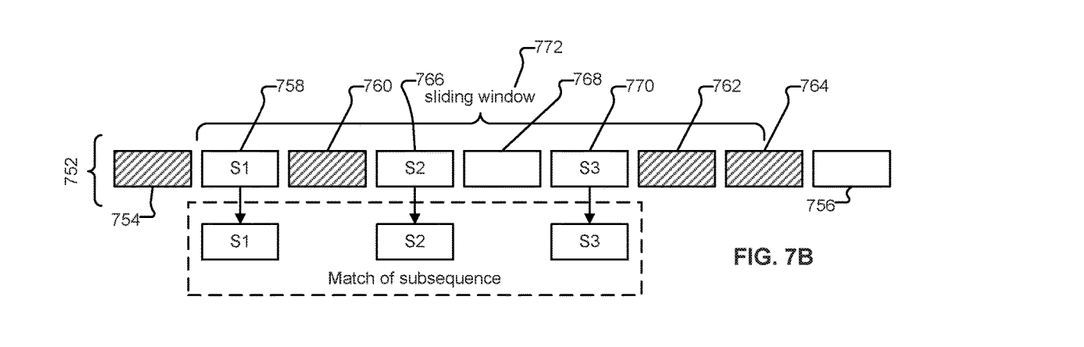
FIG. 7B depicts a representation of the event sequence shown in FIG. 7A.

FIG. 7B depicts a representation of the event sequence shown in FIG. 7A. Events associated with host1 are depicted, in region 752, as shaded boxes (e.g., box 754) and events associated with host2 are depicted as unshaded boxes (e.g., box 756). In particular, box 754 corresponds to line 1 of the log data shown in FIG. 7A (702)—a UDP connection made by host1. Box 758 corresponds to line 2 of the log data shown in FIG. 7A (and, line 404 of the Sarodip malware profile shown in FIG. 4A). Boxes 760, 762, and 764 correspond to the web browsing activities of host1. Box 766 corresponds to line 3 of the log data shown in FIG. 7A (and, line 414 of the Sarodip malware profile shown in FIG. 4A). Box 768 corresponds to line 4 of the log data shown in FIG. 7A (and is not relevant to the Sarodip malware profile). Finally, box 770 corresponds to line 6 of the log data shown in FIG. 7A.

A match can be performed using malware profile 4A, on a host by host basis, against the log entries shown in FIG. 7A. In various embodiments, a match of subsequence is used (e.g., to take into account that a given host will likely engage in multiple activities in parallel, at least some of which are likely unrelated to potential compromise). A sliding window (772) of five minutes is used when performing the matching, in accordance with the time window specified at 420 in the Sarodip malware profile. Performing such a match will identify that host2 has been compromised by Sarodip. A variety of actions can be taken in response to such a determination, such as quarantining the compromised host from communicating with other nodes within enterprise network 140, alerting an administrator, etc.

Figure 8:
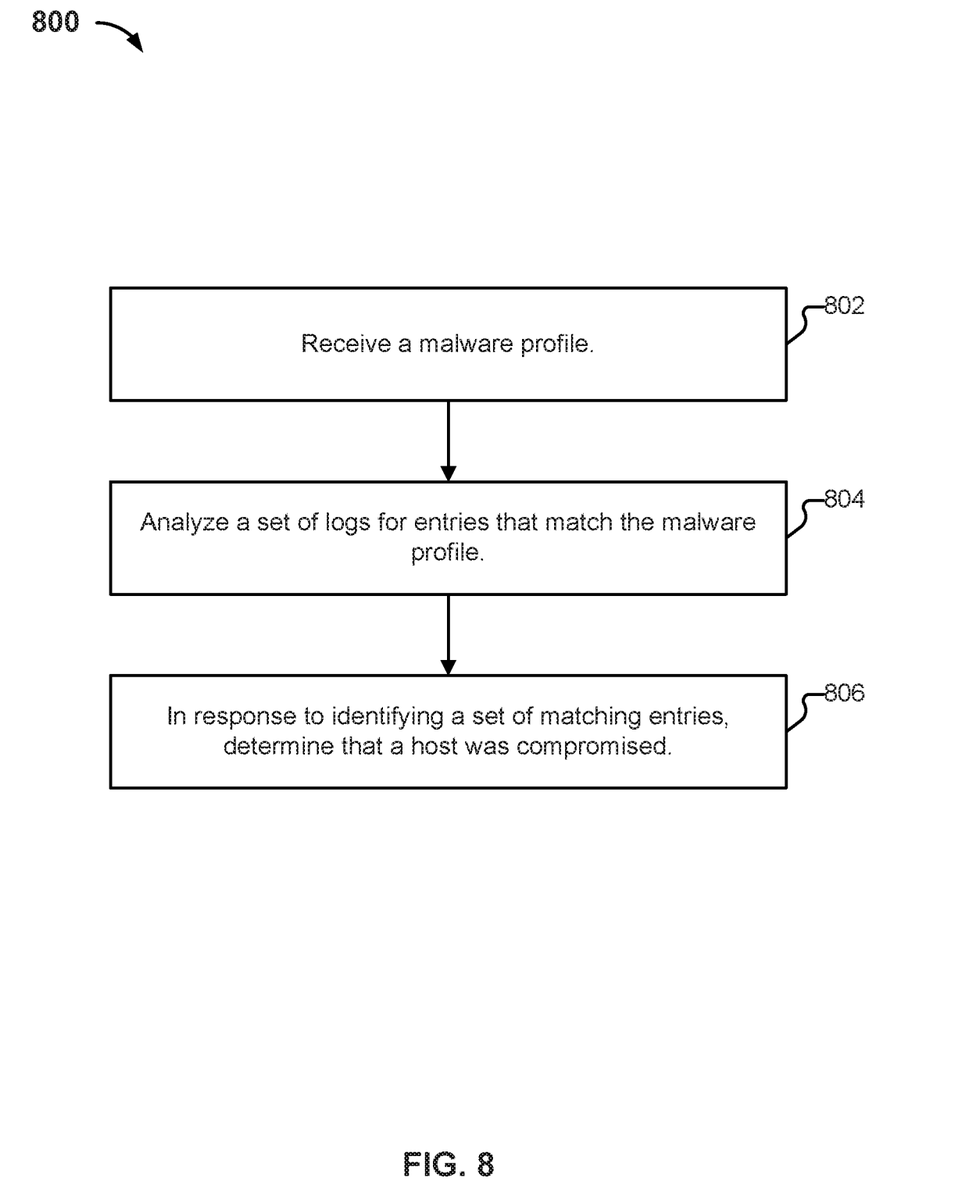
FIG. 8 illustrates an example of a process for using a malware profile to identify a compromised host.

FIG. 8 illustrates an example of a process for using a malware profile to identify a compromised host. In various embodiments, process 800 is performed by data appliance 102, and in particular by malware analysis module 112. Malware analysis module 112 can be implemented using a script (or set of scripts) authored in an appropriate scripting language (e.g., Python). In various embodiments, process 800 is performed as a third party service (e.g., where data appliance 102 provides its logs to security platform 122 for analysis). Process 800 can also be performed on an endpoint, such as client device 104 (e.g., by an endpoint protection application executing on client device 104).

Process 800 begins at 802 when a malware profile is received. A malware profile can be received at 802 in response to a variety of actions. As one example, an administrator (e.g., of data appliance 102) can provide a malware profile (e.g., malware profile 4A) to data appliance 102 in conjunction with an audit or other explicit inquiry about whether any nodes in network 140 might be compromised by Sarodip. As another example, data appliance 102 can receive a malware profile at 802 as part of a regular content update (e.g., along with one or more other malware profiles). As yet another example, data appliance 102 can receive a malware profile at 802 when data appliance 102 receives a verdict (e.g., about malware 130, after security platform 122 completes its analysis).

At 804, a set of logs is analyzed for entries that match the malware profile. As applicable, malware analysis module 112 can join multiple individual logs (e.g., a traffic log and a URL log) in RAM prior to analyzing the set of logs. Similarly, where it is desired to examine longer periods of log data, multiple logs of the same type (e.g., a traffic log for January 1-7 and a traffic log for January 8-14) can be joined. The analysis performed at 804 can be triggered by an event (e.g., receipt of the profile or receipt of an instruction provided by an administrator to begin analysis). The analysis performed at 804 can also be performed periodically (e.g., daily or weekly).

Finally, at 806, in the event a set of log entries is found to match the malware profile, the host implicated in the log entries is determined to be compromised. As mentioned above, a variety of remedial actions can be taken in response to a determination that the host has been compromised, such as quarantining the host from communicating with other nodes within enterprise network 140, alerting an administrator, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a hardware processor, coupled to a memory and configured to:
        receive a malware profile, wherein the malware profile comprises a sequence of network events and corresponding attributes previously taken by a known malicious application during execution of the known malicious application, wherein the malware profile was generated at least in part by filtering out, from a raw profile comprising network activity events, system-generated events taken by a sample analysis system coincident to the execution of the malicious application, wherein the filtering out of the system-generated events includes filtering out network activities associated with a predetermined network protocol, and wherein at least some of the network activities comprise a roundtrip request-response pair;

analyze a set of one or more logs for a set of entries occurring within a predetermined sliding time window that matches the malware profile;

determine, based at least in part on identifying the set of entries occurring within the predetermined sliding time window as matching the malware profile, that a host was compromised; and in response to determining that the host has been compromised, take a remedial action with respect to the host;

wherein the memory is configured to provide the processor with instructions.

2. The system of claim 1, wherein the set of logs comprises entries associated with a plurality of hosts and wherein analyzing the set of logs includes performing, for each respective host included in the plurality of hosts, a search.

3. The system of claim 1, wherein identifying that the set of entries matches the malware profile comprises determining a subsequence match.

4. The system of claim 1, wherein the processor is further configured to transmit a copy of a sample to a security platform for analysis.

5. The system of claim 4, wherein the malware profile is received from the security platform.

6. The system of claim 5, wherein the malware profile is received in response to the security platform determining that the sample is malicious.

7. The system of claim 1, wherein analyzing the set of one or more logs is performed periodically.

8. The system of claim 1, wherein analyzing the set of one or more logs is performed in response to receipt of the malware profile.

9. The system of claim 1, wherein the malware profile is generated at least in part by abstracting a capture of network activity associated with the execution of the known malicious application into a set of network activities taken by the known malicious application.

10. The system of claim 1, wherein at least one activity included in the malware profile comprises service probing.

11. The system of claim 1, wherein at least one activity included in the malware profile comprises a denial of service activity.

12. The system of claim 1, wherein at least one activity included in the malware profile comprises a local action taken by the known malicious application.

13. The system of claim 1, wherein the malware profile corresponds to a malware family and wherein the known malicious application shares the malware profile with a plurality of malicious applications that are members of the malware family.

14. A method, comprising:

receiving a malware profile, wherein the malware profile comprises a sequence of network events and corresponding attributes previously taken by a known malicious application during execution of the known malicious application, wherein the malware profile was generated at least in part by filtering out, from a raw profile comprising network activity events, system-generated events taken by a sample analysis system coincident to the execution of the malicious application, wherein the filtering out of system-generated events includes filtering out network activities associated with a predetermined network protocol and wherein at least some of the network activities comprise a roundtrip request-response pair;

analyzing a set of one or more logs for a set of entries occurring within a predetermined sliding time window that matches the malware profile;

determining, based at least in part on identifying the set of entries occurring within the predetermined sliding time window as matching the malware profile, that a host was compromised; and in response to determining that the host has been compromised, taking a remedial action with respect to the host.

15. The method of claim 14, wherein the set of logs comprises entries associated with a plurality of hosts and wherein analyzing the set of logs includes performing, for each respective host included in the plurality of hosts, a search.

16. The method of claim 14, wherein identifying that the set of entries matches the malware profile comprises determining a subsequence match.

17. The method of claim 14, wherein the malware profile is generated at least in part by abstracting a capture of network activity associated with the execution of the known malicious application into a set of network activities taken by the known malicious application.

18. The method of claim 14, further comprising transmitting a copy of a sample to a security platform for analysis.

19. The method of claim 18, wherein the malware profile is received from the security platform.

20. The method of claim 19, wherein the malware profile is received in response to the security platform determining that the sample is malicious.

21. The method of claim 14, wherein analyzing the set of one or more logs is performed periodically.

22. The method of claim 14, wherein analyzing the set of one or more logs is performed in response to receipt of the malware profile.

23. The method of claim 14, wherein at least one activity included in the malware profile comprises service probing.

24. The method of claim 14, wherein at least one activity included in the malware profile comprises a denial of service activity.

25. The method of claim 14, wherein at least one activity included in the malware profile comprises a local action taken by the known malicious application.

26. The method of claim 14, wherein the malware profile corresponds to a malware family and wherein the known malicious application shares the malware profile with a plurality of malicious applications that are members of the malware family.

27. A computer program product embodied in a non-transitory computer readable storage medium and comprising computer instructions for:

receiving a malware profile, wherein the malware profile comprises a sequence of network events and corresponding attributes previously taken by a known malicious application during execution of the known malicious application, wherein the malware profile was generated at least in part by filtering out, from a raw profile comprising network activity events, system-generated events taken by a sample analysis system coincident to the execution of the malicious application, wherein the filtering out of system-generated events includes filtering out network activities associated with a predetermined network protocol, and wherein at least some of the network activities comprise a roundtrip request-response pair;

analyzing a set of one or more logs for a set of entries occurring within a predetermined sliding time window that matches the malware profile;

determining, based at least in part on identifying the set of entries occurring within the predetermined sliding time window as matching the malware profile, that a host was compromised; and in response to determining that the host has been compromised, taking a remedial action with respect to the host.

\* \* \* \* \*